(12) United States Patent
Signorini et al.

(10) Patent No.: US 11,671,414 B2
(45) Date of Patent: Jun. 6, 2023

(54) BLOCKCHAIN-BASED AUTHENTICATION METHOD AND SYSTEM

(71) Applicant: Nokia Technologies Oy, Espoo (FI)

(72) Inventors: Matteo Signorini, Nozay (FR);
Roberto DiPietro, Nozay (FR); Wael Kanoun, Nozay (FR)

(73) Assignee: Nokia Technologies Oy, Espoo (FI)

( * ) Notice: Subject to any disclaimer, the term of this patent is extended or adjusted under 35 U.S.C. 154(b) by 388 days.

(21) Appl. No.: 16/484,889

(22) PCT Filed: Feb. 7, 2018

(86) PCT No.: PCT/EP2018/052990
§ 371 (c)(1),
(2) Date: Aug. 9, 2019

(87) PCT Pub. No.: WO2018/146113
PCT Pub. Date: Aug. 16, 2018

(65) Prior Publication Data
US 2019/0386970 A1    Dec. 19, 2019

(30) Foreign Application Priority Data
Feb. 10, 2017  (EP) ..................................... 17305152

(51) Int. Cl.
*H04L 9/40* (2022.01)
*H04L 9/06* (2006.01)
*H04L 9/00* (2022.01)

(52) U.S. Cl.
CPC .......... *H04L 63/061* (2013.01); *H04L 9/0643* (2013.01); *H04L 63/0876* (2013.01);
(Continued)

(58) Field of Classification Search
CPC . H04L 63/061; H04L 9/0643; H04L 63/0876; H04L 63/0884; H04L 2209/38;
(Continued)

(56) References Cited

U.S. PATENT DOCUMENTS 9,875,510 B1\* 1/2018 Kasper ................... G06Q 40/12
2016/0028552 A1\* 1/2016 Spanos ................. H04L 9/3236
713/178
(Continued)

FOREIGN PATENT DOCUMENTS

| CN | 104811450 A | 7/2015 |
| CN | 105959307 A | 9/2016 |
| WO | WO 2016/191376 A1 | 12/2016 |

OTHER PUBLICATIONS

Melanie Swan, "Blockchain: Blueprint for a New Economy," XP055279098, 149 pages, 2015.
(Continued)

*Primary Examiner* — Taghi T Arani
*Assistant Examiner* — Blake I Narramore
(74) *Attorney, Agent, or Firm* — Lippes Mathias LLP

(57) ABSTRACT

A method and system of authenticating a device within a network of connected devices that share a ledger of transactions between them under the form of exchanged blockchain messages and comprising: computing a PoK chain (70) based on the enhanced blockchain, receiving an authentication request from an application or a device, the authentication request including one or more PoKs (71), retrieving from the PoK database the PoK chain (70) corresponding to the application or device identified in the authentication request; computing a PoK (71) based on the PoK chain (70) retrieved from the PoK database, comparing it with the PoK (71) included in the authentication request, and if they match, validating the authentication request.

12 Claims, 4 Drawing Sheets

(52) U.S. Cl.
CPC ............ *H04L 63/0884* (2013.01); *H04L 9/50* (2022.05); *H04L 2209/80* (2013.01)

(58) Field of Classification Search
CPC ............... H04L 2209/80; H04L 9/3218; H04L 2209/30
See application file for complete search history.

(56) References Cited

U.S. PATENT DOCUMENTS

| | | | |
|---|---|---|---|
| 2016/0162873 A1* | 6/2016 | Zhou | G06F 3/002 705/65 |
| 2016/0162897 A1* | 6/2016 | Feeney | G06Q 20/065 705/71 |
| 2016/0275461 A1* | 9/2016 | Sprague | H04L 9/3234 |
| 2016/0283920 A1* | 9/2016 | Fisher | H04L 9/3297 |
| 2016/0330034 A1* | 11/2016 | Back | H04L 9/3255 |
| 2017/0132620 A1* | 5/2017 | Miller | H04L 9/30 |
| 2017/0236094 A1* | 8/2017 | Shah | G06Q 10/101 705/300 |
| 2017/0346833 A1* | 11/2017 | Zhang | H04L 9/3218 |
| 2018/0088928 A1* | 3/2018 | Smith | H04L 9/3239 |
| 2018/0097630 A1* | 4/2018 | Suresh | G06F 7/724 |
| 2018/0109541 A1* | 4/2018 | Gleichauf | H04L 63/123 |
| 2018/0114218 A1* | 4/2018 | Konik | G06Q 40/08 |
| 2018/0219669 A1* | 8/2018 | Chen | H04L 9/0891 |
| 2018/0356979 A1* | 12/2018 | Yu | G06F 3/061 |
| 2019/0139031 A1* | 5/2019 | Wright | H04L 9/3242 |
| 2019/0228413 A1* | 7/2019 | Naganuma | G06Q 20/407 |
| 2019/0289019 A1* | 9/2019 | Thekadath | H04L 9/3239 |

OTHER PUBLICATIONS

Ahmed Kosba et al., "Hawk: The Blockchain Model of Cryptography and Privacy-Preserving Smart Contracts," International Association for Cryptologic Research, XP061018923, pp. 1-32, 2015.
International Search Report for PCT/EP2018/052990 dated May 4, 2018.

* cited by examiner

BLOCKCHAIN-BASED AUTHENTICATION METHOD AND SYSTEM

FIELD OF THE INVENTION

The invention relates to the technical field of security within a network of connected devices implementing blockchain technology.

BACKGROUND

The actual model for device identification and authentication in the Internet is based on atomic protocols where a prover and a verifier exchange information and try to verify them. However, the same information exchanged during the identification protocol can be modified/misused and should not be trusted. This is mainly due to two aspects. First, it is currently cumbersome to physically and permanently tie a device to its identity and, second, the identity itself should not be trusted as it can be easily hacked.

To solve the above issues, authentication protocols are usually employed. They can be split to centralized and de-centralized. On the one hand, centralized protocols are based on trusted third parties (such as certification authorities) which are responsible for pairing digital identities to secret data which are given to devices. With this approach, thanks to the trustworthiness in the certification authorities, once an identity is claimed by digitally signing a message, the device sending the message is recognized and authenticated as it is assumed that the secret used to sign the message (e.g. the private key in asymmetric cryptographic solutions, like for RSA based signatures) is kept private and is never accessed by other devices.

On the other hand, decentralized authentication protocols try to avoid trusted third parties. The computation and/or the information is then distributed among different devices which must agree on the trustworthiness of a given identity. This approach solves the problem of outsourcing the trust to an external entity by avoiding the exposition of sensitive/private information. However, it is hard to build a trusted network as it is not possible to detect if all the devices are cooperating/working as expected. To address this problem, over the last years, remote attestation techniques tried to solve the problem of remotely recognizing untrusted devices (such as WO2014141074 or U.S. Pat. No. 8,966,249) via hardware or software approaches. These techniques are based on strong assumptions and, as such, they do not solve the problem but rather make it harder to be accomplished.

More recently, blockchain technology was devised and published (originally in the context of Bitcoin) allowing to securely share or process data between multiple parties over a network of non-trusted peers.

SUMMARY

The invention provides for blockchain-based authentication methods and systems by building a self-enforced and self-managed network where devices can control the behavior and the trustworthiness of each other without the need of central authorities or software and hardware elements which are assumed secure and trusted by design.

The basic idea of the invention consists in providing a decentralized authentication protocol that leverages multiple blockchain distributed ledgers to build a trust continuity factor. To do this, this invention defines a Proof Of Knowledge (PoK) blockchain. This PoK blockchain contains a history of the past blockchain activities and represents a network footprint that can only be recognized/verified by the other peers in the same network. The PoK blockchain is built and updated locally on each device over time, as the blockchain changes. An application or device may be authenticated by sending the PoK.

The invention provides a device to be connected to a network where connected devices share a ledger of transactions between them under the form of a main blockchain composed of blocks, each block containing a timestamp and a link to a previous block, such device comprising:

a chain manager being configured to add forked chains extracted at the device to a main blockchain in order to build an enhanced blockchain and to store the enhanced blockchain in a chain database;

the device further comprising:

a Proof-of-Knowledge—i.e. PoK—manager comprising:

a PoK builder being configured to compute at least one PoK chain based at least on the enhanced blockchain, a PoK chain being composed of PoK blocks, each PoK block containing a timestamp and a link to a previous PoK block, a PoK database storing the PoK chain;

an authentication manager configured to receive an authentication request from an application or a device, the authentication request including at least one PoK, retrieve, from the PoK database, at least one PoK chain corresponding to the application or device identified in the authentication request;

send the at least one PoK included in the authentication request and the at least one PoK chain retrieved from the PoK database to an authentication validator, the authentication validator being configured to compute at least one PoK based on the at least one PoK chain retrieved from the PoK database, compare it with the at least one PoK included in the authentication request, and if they match, validate the authentication request.

In embodiments, the device further comprises a miner and a fork broadcast, the miner being configured to analyze received blockchains messages, build a new block according to the received blockchains messages, and send the new block to the fork broadcast and to all the other devices within the network, the fork broadcast being configured to receive blocks from the miner and from other devices within the network and to extract forked chains from received blocks.

In embodiments, the PoK builder is configured to aggregate, using an aggregation function, each forked chain head of the enhanced block chain with the block of the main chain they are attached to so as to form a single PoK block, the PoK blocks forming the PoK chain.

In embodiments, the aggregation function is a Hash function.

In embodiments, the aggregation function is a bitwise XOR.

In embodiments, the device further comprises an authentication database storing for each device or application a time of last authentication, and wherein, the authentication manager is configured to retrieve from the authentication database the time of last authentication of the application or device, and forward it to the authentication validator, and wherein, the authentication validator computes the PoK by aggregating the blocks of the PoK chain retrieved from the PoK database having a timestamp comprised between the time of last authentication of the application or device and the current time.

In embodiments, the request for authentication includes a PoK policy including a list of PoK chains required to compute the PoK and to validate the authentication request, the device further comprising a cooperation manager configured to interact with other devices within the network in order to retrieve additional PoK chains, and wherein, the authentication manager is further configured, if the PoK database of the device does not include all the PoK chains required in the PoK policy, to send a request for additional PoK chains to the cooperation manager.

In embodiments, the request for additional PoK chains comprises all PoK chains stored in the PoK database of the device, the PoK chains included in said request being intended to be used by the device receiving said request for authenticating the sender of said request.

The invention also provides a method of authenticating a device within a network of connected devices that share a ledger of transactions between them under the form of a blockchain composed of blocks, each block contains a timestamp and a link to a previous block, the method comprising:

extracting forked chains from received blocks;
adding all forked chains to a main blockchain in order to build an enhanced blockchain;
storing the enhanced blockchain in a chain database;
computing at least one PoK chain based at least on the enhanced blockchain, a PoK chain being composed of PoK blocks, each PoK block containing a timestamp and a link to a previous PoK block,
receiving an authentication request from an application or a device, the authentication request including at least one PoK,
retrieving from the PoK database at least one PoK chain corresponding to the application or device identified in the authentication request;
computing at least one PoK based on the at least one PoK chain retrieved from the PoK database, comparing it with the at least one PoK included in the authentication request, and if they match, validating the authentication request.

In embodiments, the method further comprises analyzing received blockchains messages, building a new block according to the received blockchains messages, and sending the new block to all the other devices within the network.

In embodiments, the request for authentication includes a PoK policy including a list of PoK chains required to compute the PoK and to validate the authentication request, the method further comprising:

if the PoK database does not include all the PoK chains required in the PoK policy, retrieving additional PoK chains from other devices within the network, The method further comprises a computer program comprising executable code that causes a computer to perform all the steps of a method as described above when executed.

This invention enables the creation of trust relationships kept alive by continuously exchanging information about the network activity over time. This allows the establishment of self-enforced and self-managed networks without the need of any trusted third party such as certification authorities. Another feature is that this trust relationship can be verified in a totally distributed and decentralized manner. The trust relationship between two devices is defined in an initial setup process (that can be done by the device owner or an administrator) and it is then seamlessly kept alive by them (without any security assumption) for as long as they remain in the same network or context. Once one of the two devices leaves the network, it gets de-authenticated and if it comes back it will be required again to pass the initial setup process.

To avoid central point of trust, such as certification authorities, all the other solutions leverage distributed approaches where each device cooperates in controlling the network. However, in order to prove its trustworthiness, each device has to authenticate itself and to prove the integrity of the data being provided. To do so, they need strong security assumptions on hardware or software elements that are exploited to store cryptographic keys used to sign and/or encrypt all the communications.

This invention builds trusted communications without any security assumption on the involved devices. Indeed, it is impossible for a device to alter the blockchain or to forge fake forks. This also avoids any need of encryption or signature primitives.

BRIEF DESCRIPTION OF THE DRAWINGS

These and other aspects of the invention will be apparent from and elucidated with reference to the embodiments described hereinafter, by way of example, with reference to the drawings.

DETAILED DESCRIPTION OF THE EMBODIMENTS

Figure 1:
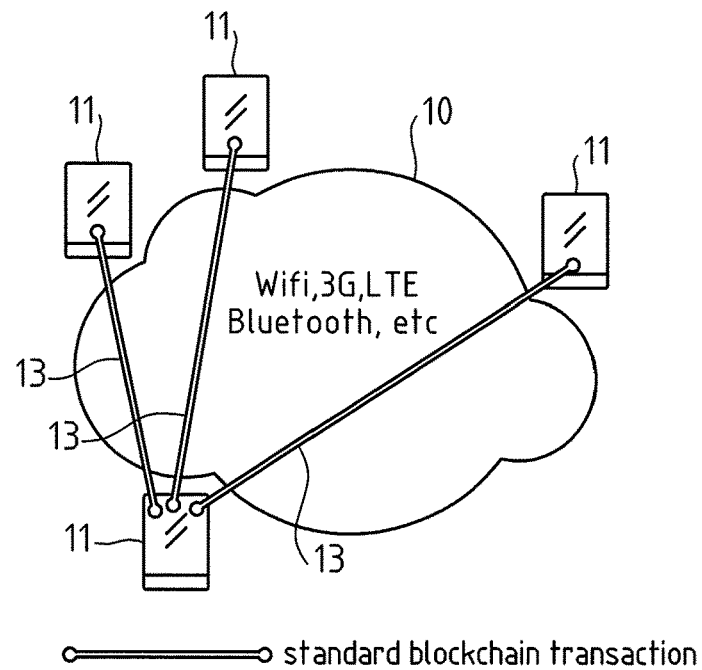
FIG. 1 is a representation of a network with connected devices implementing the blockchain technology.

FIG. 1 is a representation of a network 10 with connected devices 11 implementing the blockchain technology. Network 10 may be Wifi, 3G, LTE, Bluetooth, RFID/NFC, wired connections, or any type of network that supports protocols for exchanges of messages between connected devices over connections 13. The messages being exchanged can belong to one or multiple blockchain-based applications on different levels such as HTTP/FTP based applications (to keep track of network traffic), SSH/Telnet/RDP/VNC/VPN based applications (to keep track of remote accesses), RFID/NFC based applications (to keep track of physical interactions), Wi-Fi application, Bluetooth application, etc. Each application or protocol to monitor is associated with at least a blockchain. Different blockchains may be associated with the same application or protocol.

Each connected device 11 maintains all the ledgers (i.e. the blockchains) which are shared between connected devices and to which it has access.

Each connected device 11 can contain a miner 20 depending on its resources and computational power. Messages received at the miner 20 contain standard blockchain transactions which are collected to build the next block within the mainstream chain. Each block contains a timestamp and a link to a previous block. Once a new block has been built by the miner 20, it is sent in broadcast to all the other devices. Each new block built by the miner 20 of the device or received by another miner is added to the blockchain and written in a blockchain database 21. Once a device receives one or multiple blocks which have been built by other devices, it compares the new blocks with the one locally stored. If they do not match, and the received chain is longer than the local one, the local chain is labeled as a fork. Once a fork is detected, the miner discards it and overwrites a portion/all of the blockchain with the new received one. Forks are discarded as they create concurrent mining with parallel branches from the main chain 60. These parallel branches, may lead to conflicting transactions which, in blockchain-based contexts, is particularly problematic.

Due to delays in the network, devices belonging to a same group (associated to a same context) see blockchain changes in the same way (receive blockchain updates in the same order), while devices from other groups (belonging to other contexts) see blockchain changes differently (receive blockchain updates in different orders).

A novel authentication method based on the blockchain technology and exploiting the above mentioned observation is provided.

Figure 3A:
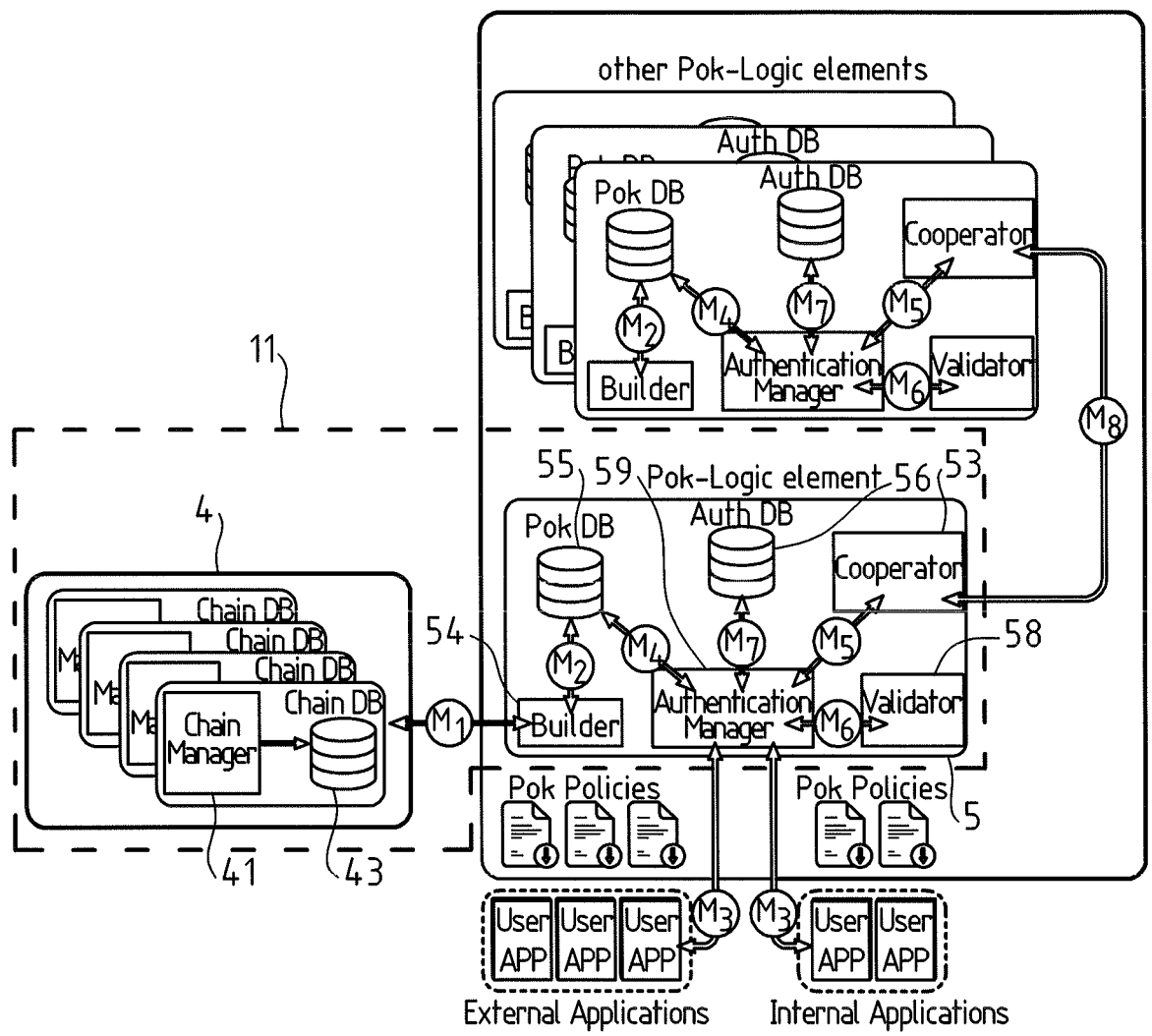
FIG. 3 is a functional representation of a connected device that implements the blockchain-based authentication method according to the invention.
FIG. 3b is a functional representation of an enhanced blockchain manager according to an embodiment of the invention

A connected device 11 according to the invention is illustrated on FIG. 3. The device contains the miner 20 and the blockchain database 21. In addition, it contains an enhanced blockchain manager 4 and a proof of knowledge (PoK) manager 5.

Figure 3B:
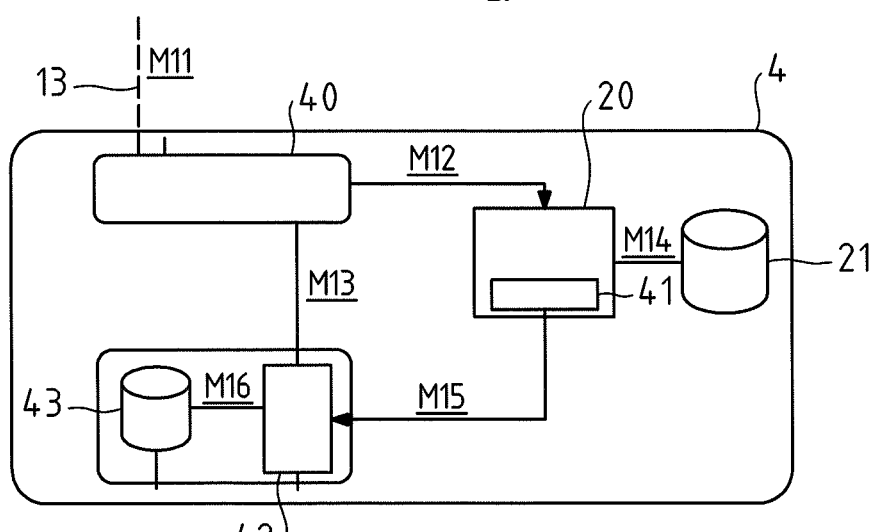

In reference to FIG. 3b, the enhanced blockchain manager 4 contains:

- a transaction filter 40 that intercepts blockchain messages (M11) and forwards them to both the miner (with M12 messages), and a chain manager 42 with M13 messages. This parallel processing allows the un-interrupted (i.e. not modified or slowed down) handling of standard blockchain protocol by the miner and the blockchain database, through M14 message. The transaction filter collects M11 metadata such as the message sender, the recipient, the timestamp, and discards duplicated messages.
- a fork broadcast 41, added to the miner, extracts any forked chain (M15) before it is discarded and overwritten by the miner.
- a chain manager 42 receives M13 messages from the transaction filter, and M15 messages from the fork broadcast. The chain manager computes from M13 and M15 an enhanced blockchain composed by the standard blockchain, and the forked chains. As M13 and M15 do not describe the whole chain but rather updates on top of it, the chain manager retrieves through M16 the main blockchain 60 from the chain database 43. Then it merges to the main blockchain 60 all the information obtained with M13 and/or M15. Once the enhanced blockchain has been computed, it is sent back through M16 to be stored in the chain database 43. M13 and M15 do not necessarily reach the chain manager at the same time. Hence, the chain manager can receive either M13 messages (each time a standard blockchain message has been received) or M15 messages (each time M12 forces the miner to discard previous forks).

The PoK manager 5 comprises:

- a PoK builder 54 being configured to load the up to date version of the enhanced blockchain from the chain database 21, and compute a PoK chain 70 based on the forked chained heads (the latest block in each forked chain) and on the main blockchain, and to send the PoK chain 70 to an authentication manager 59 in response to a request of authentication;
- a PoK database 55 storing all the PoK chains, one for each application or/and protocol being monitored by the blockchains;
- the authentication manager 59 being configured to receive an authentication request including a proof of knowledge value (PoK) 71, and load PoK chains from the PoK database 55;
- an authentication validator 58 configured to compare the information obtained from the authentication manager 59 to control if the PoK received is the same as the one internally stored within the PoK database 55 and if they match, validating the authentication request.

Figure 2:
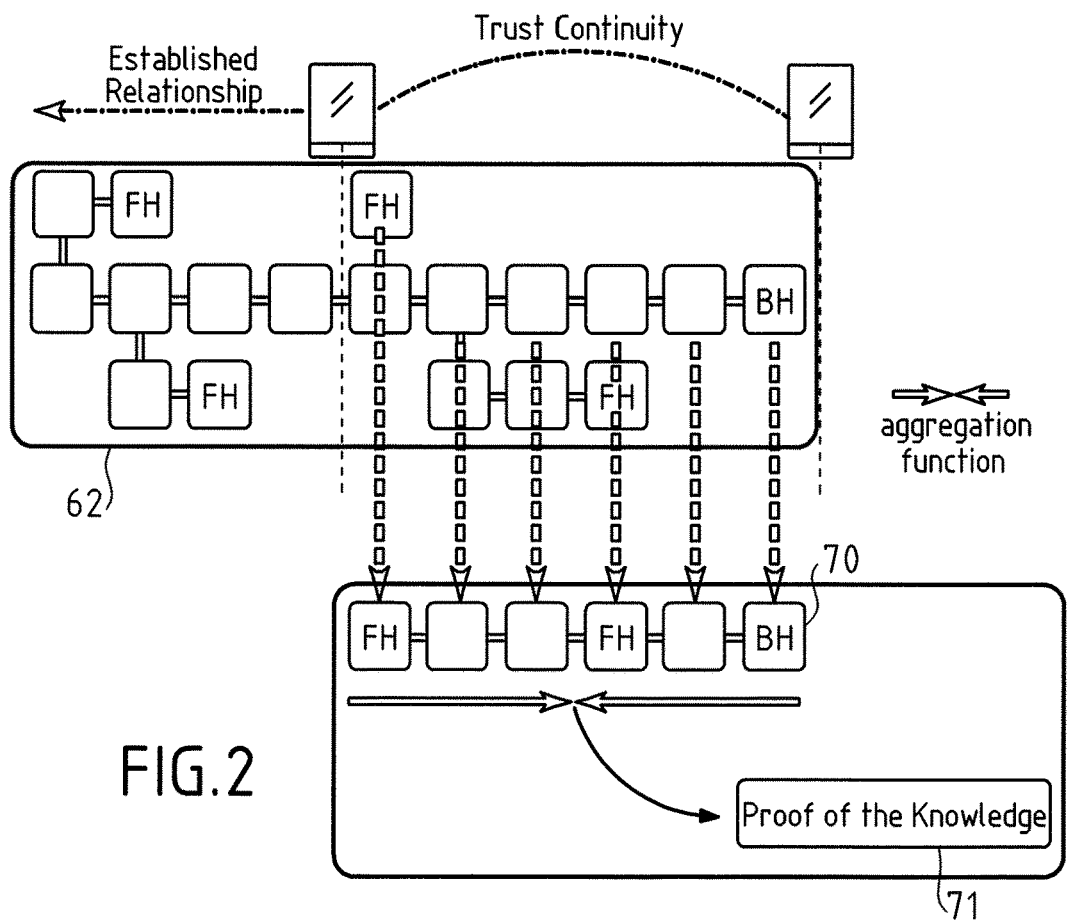
FIG. 2 illustrates the proof of knowledge (PoK) construction according to the invention.

As illustrated by FIG. 2, the PoK builder 54 loads (M1) one enhanced blockchain for each application or protocol to monitor. The PoK builder 54 first reduces the complexity/size of the enhanced blockchains by aggregating and consolidating the forked chains with an aggregation function (e.g. a Hash function, a bitwise XOR, etc.). All the devices use the same aggregating function. Then it again aggregates the remaining forked chain heads (FHs) to obtain the PoK chain 70 which is the original blockchain merged with FH information.

Figure 4:
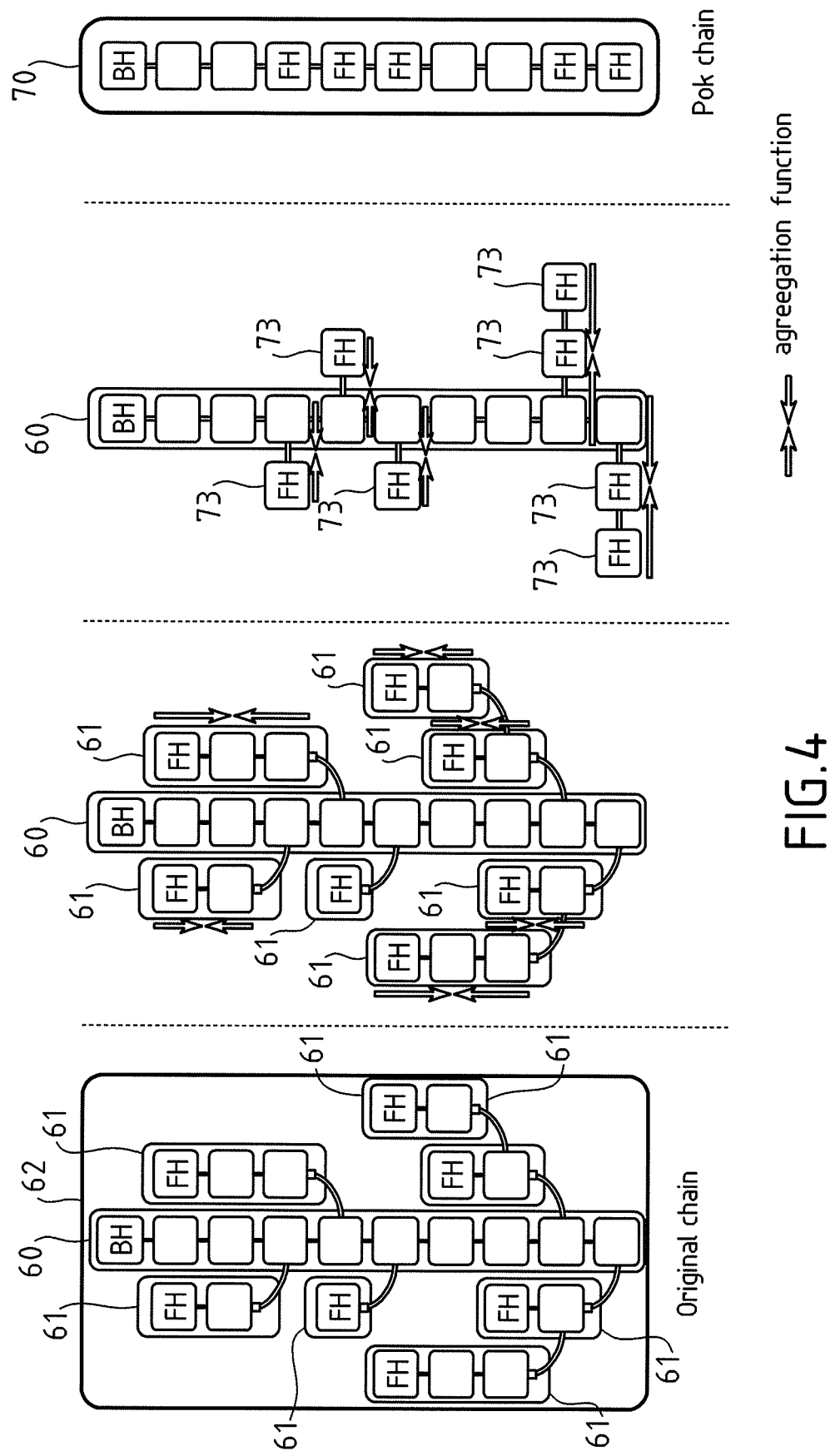
FIG. 4 illustrates the PoK chain computation according to the invention.

FIG. 4 illustrates the PoK chain 70 built by the PoK builder 54. Starting from the enhanced blockchain, the forked chain heads FH are collected and exploited to build, together with the main blockchain blocks, a proof of knowledge (PoK). The enhanced blockchain 62 stored in chain database 21 is composed of the main blockchain 60 headed by a block head BH, and other forked chains 61, each one headed by its own fork head block FH. Each forked chain 61 of the enhanced block chain 62 is aggregated using the aggregation function into a single forked block 73. Then, all the forked blocks are aggregated with their origin block in the main chain 60 so as to form a single PoK block, the PoK blocks forming the PoK chain 70.

Figure 6:
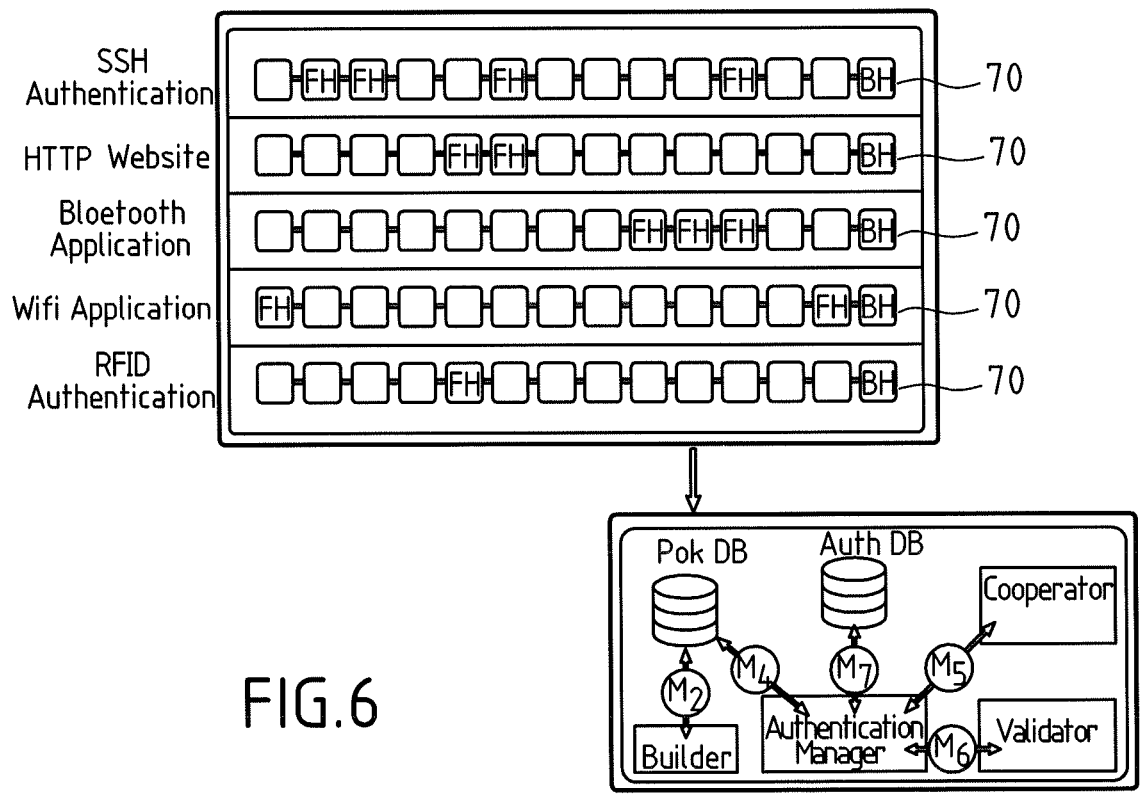
FIG. 6 illustrates the proof of knowledge database.

All the PoK chains 70, one for each application or protocol being monitored by the blockchains, are then stored (M2) within the PoK database 55 as shown in FIG. 6.

The authentication manager 59 receives authentication requests from internal/external applications and verifies them. Upon receiving an authentication request the authentication manager 59 first loads (M4) the PoK chains from the PoK database 55 and then sends them (M6) to the authentication validator 58.

The number of PoK chains required to compute the PoK is embedded within the PoK policy which is loaded within the authentication request as shown in FIG. 4 (labeled as M3).

The device further comprises an authentication database 56 storing a list of PoK for each device or application. During the authentication validation, the authentication manager 59 retrieves (M7) from the authentication database 56 the list of PoK to provide for authentication of the application. In particular, the authentication database 56 stores for each device or application a time of last authentication. During the authentication validation, the authentication manager 59 retrieves from the authentication database 56 the time of last authentication of the application or device, and forward it to the authentication validator 58.

Figure 5:
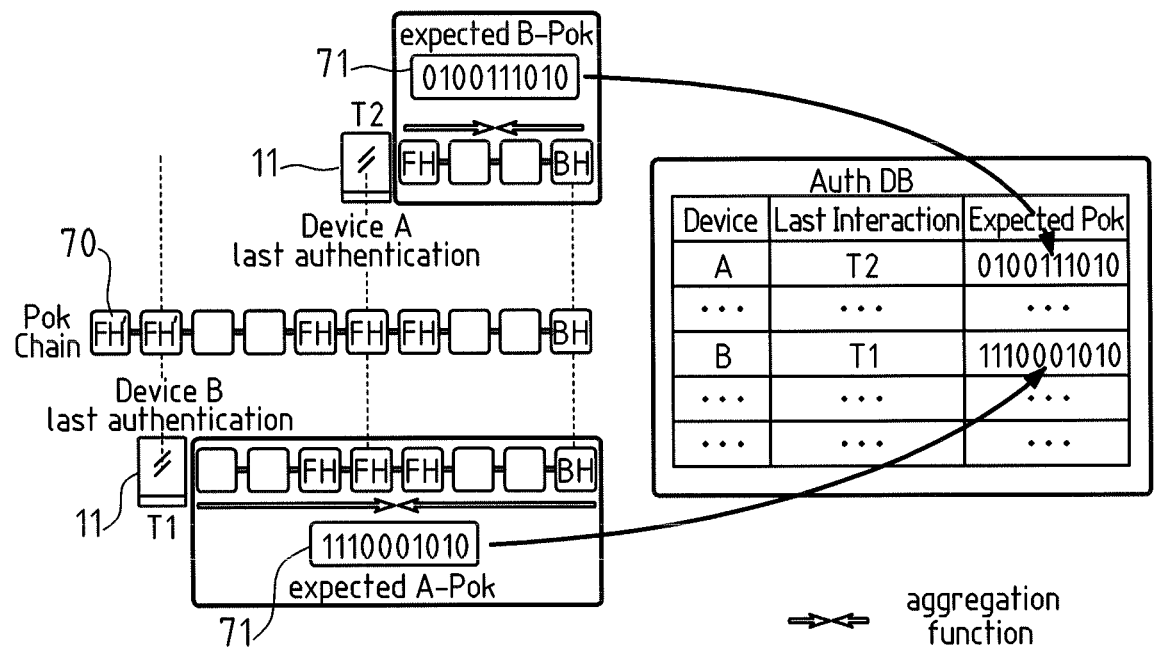
FIG. 5 illustrates the validation step according to the invention.

As illustrated by FIG. 5, the authentication validator 58 compares the PoK received in the authentication request with the PoK computed from the PoK chain stored within the PoK database 55. If they match, the authentication request is validated. To that end, the authentication validator 58 computes, for the PoK chain for the PoK chain 70 retrieved from the PoK database 55, an expected PoK 71 by aggregating the blocks of the PoK chain 70 having a timestamp comprised between the time of last authentication and the current time. The authentication validator 58 then compares the PoK 71 included in the authentication request and the PoK 71 computed with the PoK chain 70 retrieved from the PoK database 55. If they are identical, the authentication validator 58 validates the authentication request.

If some of the PoK chain 70 requested for authentication are not stored within the verifier's PoK database 55, the authentication manager 59 sends a request (message M5) to a cooperation manager 53.

The cooperation manager 53 interacts (M8) with other devices within the network in order to retrieve additional PoK information. The request for additional PoK information has to be authenticated. Thus, the authentication manager 59 writes within M5 all the information stored in the PoK database 55. The cooperation manager 53 then use the information sent in the M5 message to build an authentication request sent to other devices. Once all the external PoK information are retrieved by the cooperation manager 53, they are sent back to the authentication manager 59. Each time a new block is created it is sent to all the devices. However, due to delays in the network, devices belonging to a same group (associated to a same context) will receive the new blocks in the same order, thus being able to keep building the same enhanced blockchain 62, which will make them able to identify as a group, while devices from other groups will receive the new blocks in different orders and will build a different enhanced blockchain 62 which will make them able to identify as another group.

For example, in a peer to peer network messages are not collected in the same order due to the network latency. As such, devices can receive messages in different orders. Hence, this information can be used to distinguish between devices which are, as an example, connected to the same local network from devices which are remotely connected.

As another example, two devices will eventually agree on the blockchain but on the short term they can disagree leading to a fork. Forks can also be exploited by malicious users. Indeed, such users may try to force victim devices in accepting and using fake information. During the attack, the victim devices (which are now disconnected form the network due to the attack) will collect and share some info that will make their enhanced blockchain different from the enhanced blockchain of another group. Hence, this info may be used to distinguish between a device belonging to said group and other devices.

All devices belonging to a same group (associated to a specific context) share the same enhanced blockchain and as a consequence the same PoK. Hence, devices can prove to other devices that they he belong to the same group by comparing their PoKs. A device is able to check whether another device belongs to his own group by comparing the received PoK with the PoK that he computes based on the PoK chain retrieved from his PoK database.

Elements such as the miner, the transaction filter, the fork broadcast, the chain manager, the PoK manager, the PoK builder, the authentication manager, the authentication validator, or the cooperation manager, could each be e.g. hardware means like e.g. an ASIC, or a combination of hardware and software means, e.g. an ASIC and an FPGA, or at least one microprocessor and at least one memory with software modules located therein.

The invention is not limited to the described embodiments. The appended claims are to be construed as embodying all modifications and alternative constructions that may occur to one skilled in the art, and which fairly fall within the basic teaching as set forth herein.

The use of the verb "to comprise", "to include" or "to contain" and their conjugations does not exclude the presence of elements or steps other than those stated in a claim. Furthermore, the use of the article "a" or "an" preceding an element or step does not exclude the presence of a plurality of such elements or steps.

In the claims, any reference signs placed between parentheses shall not be construed as limiting the scope of the claims.

The invention claimed is:

1. A device to be connected to a network where connected devices share a ledger of transactions between them under the form of a main blockchain composed of blocks, each block containing a timestamp and a link to a previous block, such device comprising:
   at least one processor; and
   at least one memory including computer program code;
   the at least one memory and the computer program code configured to, with the at least one processor, cause the device at least to:
   add forked chains extracted at the device to a main blockchain in order to build an enhanced blockchain and to store the enhanced blockchain in a chain database;
   compute at least one Proof-of-Knowledge (PoK) chain based at least on the enhanced blockchain, a PoK chain being composed of PoK blocks, each PoK block containing a timestamp and a link to a previous PoK block,
   store the PoK chain in a PoK database,
   receive an authentication request from an application or a second device, the authentication request including at least one PoK,
   retrieve, from the PoK database, at least one PoK chain corresponding to the application or the second device identified in the authentication request;
   send the at least one PoK included in the authentication request and the at least one PoK chain retrieved from the PoK database to an authentication validator of the device,
   compute at least one PoK based on the at least one PoK chain retrieved from the PoK database, compare it with the at least one PoK included in the authentication request, and if they match, validate the authentication request.

2. The device of claim 1, wherein the at least one memory and the computer program code are further configured to, with the at least one processor, cause the device at least to:
   analyze received blockchain messages, build a new block according to the received blockchain messages, and send the new block to a fork broadcast of the device and to all the other devices within the network, and,
   receive blocks from a miner of the device and from other devices within the network and to extract forked chains from received blocks.

3. The device of claim 1, wherein the at least one memory and the computer program code are further configured to, with the at least one processor, cause the device at least to:
   aggregate, using an aggregation function, each forked chain head of the enhanced block-chain with the block of the main chain they are attached to so as to form a single PoK block, the PoK blocks forming the PoK chain.

4. The device of claim 3, wherein the aggregation function is a Hash function.

5. The device of claim 3, wherein the aggregation function is a bitwise XOR.

6. The device of claim 1, further comprising an authentication database storing for each device or application a time of last authentication, and
wherein the at least one memory and the computer program code are further configured to, with the at least one processor, cause the device at least to:
retrieve from the authentication database the time of last authentication of the application or the second device, and forward it to the authentication validator,
wherein, the authentication validator computes the PoK by aggregating the blocks of the PoK chain retrieved from the PoK database having a timestamp comprised between the time of last authentication of the application or device and the current time.

7. The device of claim 1, wherein, the request for authentication includes a PoK policy including a list of PoK chains required to compute the PoK and to validate the authentication request,
and wherein the at least one memory and the computer program code are further configured to, with the at least one processor, cause the device at least to:
interact with other devices within the network in order to retrieve additional PoK chains,
and if the PoK database of the device does not include all the PoK chains required in the PoK policy, to send a request for additional PoK chains to a cooperation manager of the device.

8. The device of claim 1, wherein, the request for additional PoK chains comprises all PoK chains stored in the PoK database of the device, the PoK chains included in said request being intended to be used by the device receiving said request for authenticating the sender of said request.

9. A method of authenticating a device within a network of connected devices that share a ledger of transactions between them under the form of a blockchain composed of blocks, each block contains a timestamp and a link to a previous block, the method comprising:
extracting forked chains from received blocks;
adding all forked chains to a main blockchain in order to build an enhanced blockchain;
storing the enhanced blockchain in a chain database;
computing at least one PoK chain based at least on the enhanced blockchain, a PoK chain being composed of PoK blocks, each PoK block containing a timestamp and a link to a previous PoK block,
receiving an authentication request from an application or a device, the authentication request including at least one PoK,
retrieving from the PoK database at least one PoK chain corresponding to the application or device identified in the authentication request; and,
computing at least one PoK based on the at least one PoK chain retrieved from the PoK database, comparing it with the at least one PoK included in the authentication request, and if they match, validating the authentication request.

10. The method of claim 9 further comprising analyzing received blockchain messages, building a new block according to the received blockchain messages, and sending the new block to all the other devices within the network.

11. The method of claim 9, wherein the request for authentication includes a PoK policy including a list of PoK chains required to compute the PoK and to validate the authentication request,
the method further comprising:
if the PoK database does not include all the PoK chains required in the PoK policy, retrieving additional PoK chains from other devices within the network.

12. A non-transitory computer-readable medium comprising executable code stored thereon that when executed, causes a computer to perform at least the following:
extracting forked chains from received blocks;
adding all forked chains to a main blockchain in order to build an enhanced blockchain;
storing the enhanced blockchain in a chain database;
computing at least one Proof-of-Knowledge (PoK) chain based at least on the enhanced blockchain, a PoK chain being composed of PoK blocks, each PoK block containing a timestamp and a link to a previous PoK block,
receiving an authentication request from an application or a device, the authentication request including at least one PoK,
retrieving from the PoK database at least one PoK chain corresponding to the application or device identified in the authentication request; and,
computing at least one PoK based on the at least one PoK chain retrieved from the PoK database, comparing it with the at least one PoK included in the authentication request, and if they match, validating the authentication request.

* * * * *